US005992252A

United States Patent [19]

Krajec

[11] Patent Number: 5,992,252

[45] Date of Patent: Nov. 30, 1999

[54] CONSTANT FORCE SIDE BUTTON ENGAGEMENT MECHANISM

[75] Inventor: Russell Steven Krajec, Berthoud, Colo.

[73] Assignee: Hewlett-Packard Company, Palo Alto, Calif.

[21] Appl. No.: 09/026,461

[22] Filed: Feb. 19, 1998

[51] Int. Cl.[6] .......................... F16H 21/44; F16H 55/26; F16H 1/12

[52] U.S. Cl. .......................... 74/110; 74/422; 92/130 B; 92/130 C; 185/33

[58] Field of Search .................. 74/110, 422; 92/130 C, 92/130 B; 185/32, 33

[56] References Cited

U.S. PATENT DOCUMENTS

| | | | |
|---|---|---|---|
| 576,830 | 2/1897 | Ulli | 185/33 X |
| 740,907 | 10/1903 | Page | 185/32 X |
| 958,506 | 5/1910 | Hrivnak et al. | 92/130 B X |
| 1,525,068 | 2/1925 | Carlstedt | 92/130 B X |
| 3,028,727 | 4/1962 | Anston | 185/32 X |
| 4,520,994 | 6/1985 | Dewald | 74/422 X |

*Primary Examiner*—Allan D. Herrmann

[57] ABSTRACT

The inventive button pushing mechanism allows pneumatic force to be translated actuate a button on a cellular telephone that is being tested by an automatic testing machine. The mechanism includes an actuating shaft that transmits pneumatic force to a spur gear which rotationally translates the force to actuate the button. The spur gear is also connected to a weighted counter balance shaft which opposes movement of the actuating shaft, such that when the pneumatic force is turned off, the counter balance shaft retracts the mechanism back to an initial state. The uses of gravity provides a constant and known force to oppose the pneumatic force.

36 Claims, 2 Drawing Sheets

CONSTANT FORCE SIDE BUTTON ENGAGEMENT MECHANISM

TECHNICAL FIELD OF THE INVENTION

This application relates in general to automatic testing machines, and in specific to a mechanism for engaging a button on a device which is being tested on the automatic testing machine.

BACKGROUND OF THE INVENTION

An automatic testing machine (ATM) operates in a production environment to rapidly and accurately test the operation and performance of various types of devices under test (DUT), including RF communication devices. The DUTs could be a finished product or a component of a larger system.

The ATM is programmed to perform various tests on the DUT automatically. For example, a microcomputer chip DUT may be fed power and known input signals, and the output signal of the DUT compared with expected results. Another example is where RF signals are transmitted to a finished cellular telephone DUT to determine if the telephone properly operates. Other tests could include environmental tests, such as temperature or vibration tests.

Depending upon the nature and number of the tests being performed, the testing may last from a couple of milliseconds to several minutes. The information from the testing is compared with expected test results. If there is some defect so that the DUT falls below specifications, the ATM will designate the DUT as failed, either by marking the DUT, placing the DUT in a failure area, or indicating the failure to an operator.

The ATM is then loaded with the next DUT, either manually or automatically, and the testing procedure is repeated for this DUT. This testing information can be used to evaluate the fabrication process for possible changes, as well as to perform failure analysis on individual failed devices.

ATMs are used perform operational tests on completed products. For example, ATMs will test the operation of a completed cellular telephone. This includes testing the user interface features, such as buttons, slides, switches or levers. The ATM will activate the various interface features on the product and determine whether the product responds accordingly. In order for the ATM to operate the interface features on the product, the ATM must have engagement mechanisms which couple to the interface features and will move the features in their intended manner. For example, if the interface feature is a button, then the engagement mechanism could be shaft with a nib on a distal end which contacts and pushes the button.

ATMs typically use pneumatic air to operate the fixtures which load, clamp, and then unload the devices during testing. ATMs also use pneumatic air to power the engagement mechanism. FIG. 3 depicts an internal view button engagement mechanism 30 which includes actuating shaft 31 having an actuating plunger 32. Plunger 32 is connected to a pneumatic air source (not shown). The other end of shaft 31 is nib 33 which engages the buttons of DUT (not shown) such as a cellular telephone. When pneumatic air is activated, shaft 31 moves and nib 33 contacts the button (not shown). When the air is shut off, the shaft 33 will not return back to its original position, unless acted upon by another force.

The force used to return shaft 33 to its original position is provided by spring 34. Thus, as the shaft 33 moves to contact the button via nib 33, spring 34 is compressed between collar 35 and the side of the housing of mechanism 30. The force of the air overcomes the force of spring 34, and nib 33 contacts the button. When the air is shut off, the spring returns the shaft to its original position. To ensure smooth motion of shaft 31, bearings 36 are used.

However, the use of spring 34 causes problems in measuring the operation of the DUT. The force provided by a spring is not constant. The force varies linearly depending upon the distance of compression. Thus, as spring 34 is compressed, the force generated by the compression will vary. Similarly, when spring 34 expands, the generated force will vary. Therefore, even though the force provided by pneumatic air can be made controllably constant via an air cylinder with a proportional regulator, the resulting force acting on the button will vary because of spring 34. Note that the variable force will occur in both directions, i.e. as the button is being pushed in and as the button is being released.

The variable force causes problems in measuring the performance of the product. The calculations required to determine the precise amount of force being applied to the button are complex, as the amount of force depends upon the stroke of the actuating shaft. Furthermore, springs have compression points whereby the force becomes non-linear with respect to the compressed distance. Moreover, the variable nature of the spring itself is subject to change over time, as springs are subject to wear and elastic breakdown. In a production environment, with thousands of actuating cycles being per performed per day breakdown can occur quickly. Also, no two springs perform exactly alike, as each spring will have different characteristics because of differences in materials and fabrication. Thus, the amount of force being applied to a button is inaccurate, variable, and difficult to determine.

Consequently, collecting data on the performance aspects of buttons is difficult. A constant and known force is needed to determined the activation characteristics of the button, as well as to determine the expected life time of the button.

Therefore, there is a need in the art for a system and method that allows an ATM to exert a constant and known force onto the interface features of devices, particularly button keys of cellular telephones, in a production environment.

SUMMARY OF THE INVENTION

These and other objects, features and technical advantages are achieved by a system and method that uses gravity as a retraction mechanism for the interface activating mechanism. By using counter weights to oppose the force from the pneumatic air, a constant and known force is applied to the button of the device under test. The pneumatic air actuator has a programmable output force, via an air cylinder with a proportional regulator. Since the pneumatic air force is being opposed by gravity, which is a known constant, then the resulting force used to actuate the button is known at all times. The inventive activating mechanism uses a gear wheel to translate the actuating force in the desired direction, and to set the reactionary forces of pneumatic air and gravity opposite each other.

A technical advantage of the present invention is use of gravitational force, which is constant and known, to retract the button pushing mechanism.

Another technical advantage of the present invention is use multiple shafts to receive the pneumatic force and provide the gravitational force, and actuate the button pushing nib.

A further technical advantage of the present invention is to have the multiple shafts connected in a rack and pinon manner to a spur gear which rotates in a direction determined by the dominate force, i.e. the pneumatic force or the gravitational force.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
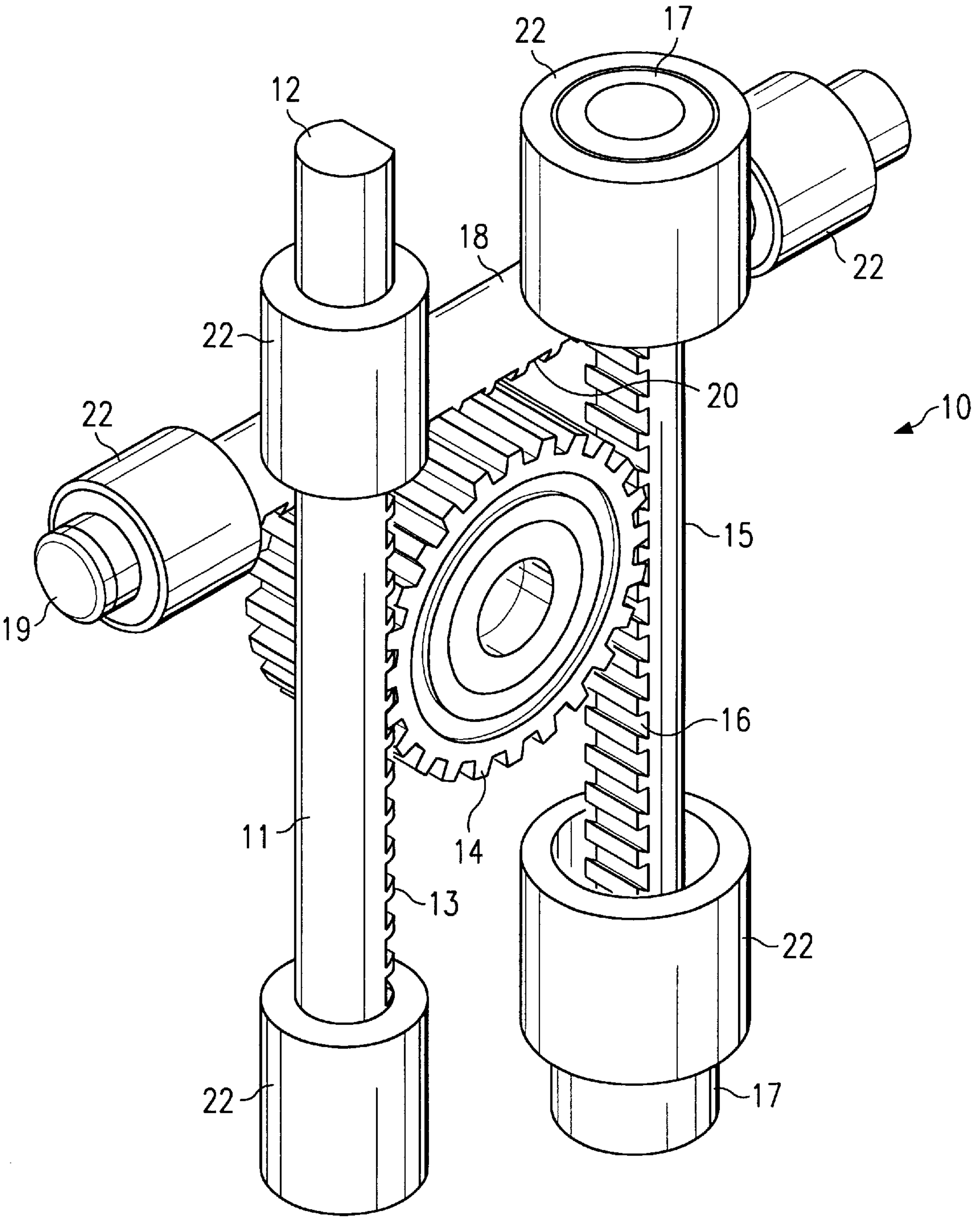
FIG. 1 depicts the inventive activating device having a gravitational retraction mechanism.
Figure 2:
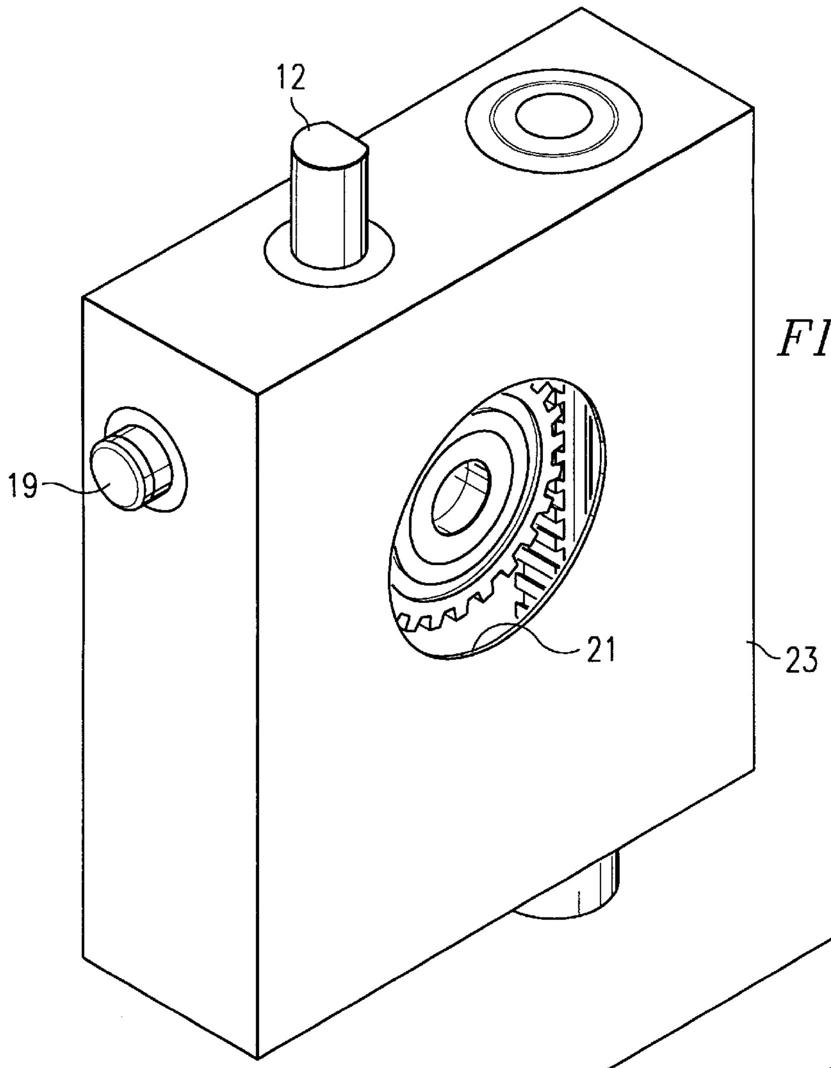
FIG. 2 depicts the device of FIG. 1 mounted in a housing.
Figure 3:
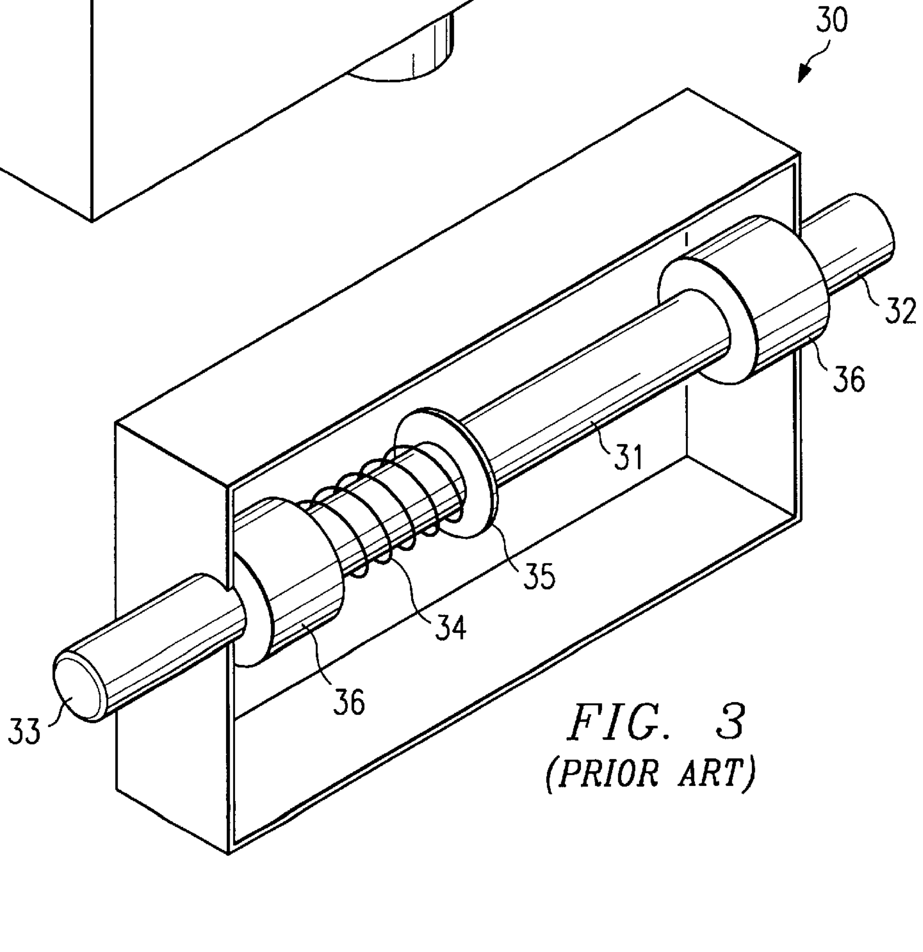
FIG. 3 (PRIOR ART)
FIG. 3 depicts a prior art button pushing mechanism.

FIG. 1 depicts the inventive activating device 10. FIG. 2 depicts the inventive activating device 10 mounted in housing 23. The force of the pneumatic air is applied to activating plunger 12 of actuating shaft 11. Plunger 12 is connected to a pneumatic air source (not shown), via a pneumatically controlled actuator (not shown) which is programmably controlled to exert a predetermined force, either variable or constant. When pneumatic air is activated, shaft 11 moves in a downward direction. Actuating shaft 11 has gear toothed face 13 which is connected to spur gear 14 in a rack and pinon manner. As shaft 11 moves downward, spur gear 14 rotates counter clockwise direction. Spur gear 14 is connected to a toothed face 16 of counter balance shaft 15 in a rack and pinon manner. Spur gear 14 is mounted to housing 23 via a screw (not shown) through the center of gear 14. As spur gear 14 rotates counter clockwise, counter balance shaft 15, is moved vertically upward, opposite to the force of gravity. Counter balance shaft 15 includes weights 17 comprising a predetermined amount of mass to generate a sufficient force such that when the pneumatic air is turned off, weights 17 will cause counter balance shaft 15 to move in a downward direction. This in turn rotates spur gear 14 in a clock wise manner, and moving actuating shaft 12 in an upward direction to return actuating shaft 12 to its original position. To ensure smooth motion of shafts 11 and 15, bearings 22 are used, which are fixed to housing 23.

Note that the actuating shaft need not be in a vertical direction. Because spur gear 14 translates the force generated by actuating shaft 11 into a rotational force, the actuating shaft can move in any direction, so long as the movement of shaft 11 causes counter balance shaft 15 to move in an upward direction, opposite to the force of gravity. Thus, counter balance shaft 15 is the only shaft that has a directional requirement. Shaft 15 must be in a vertical position, and must be moved upward by the force of the pneumatic air, such that when the air is shut off, the shaft 15 moves downward. Moreover, the counter balance shaft 15 can include the function of the actuating shaft 11, if the activating plunger 12 is located on the lower end of shaft 15. Thus, counter balance shaft can perform the functions of both shafts 11 and 15.

FIG. 1 also depicts button pushing shaft 18, having nib 19 which engages the buttons 25 of a DUT 26, such as a cellular telephone. The shape of nib 19 is dictated by the button or other interface feature of the DUT to which it will engage. Button pushing shaft 18 has gear toothed face 20 which is connected to spur gear 14 in a rack and pinon manner. As actuating shaft 11 is moved downward by pneumatic force, spur gear 14 rotates in a counter clockwise manner, and moves button pushing shaft 18 laterally to engage the button on the device (not shown). To ensure smooth motion of shaft 18, bearings 22 are used, which are fixed to housing 23. When pneumatic air is shut off, counter balance shaft 15 moves downward, and retracts button pushing shaft 18 to its original position, via spur gear 14. Snap ring 24, mounted on button pushing shaft 18, acts as stop and prevents over travel of shafts of mechanism 10.

Note that the button pushing shaft need not be in a horizontal direction. Because spur gear 14 translates the force generated by actuating shaft 11 into a rotational force, the button pushing shaft can move in any direction. Moreover, the other shafts of mechanism 10 can perform the function of the button pushing shaft. For example, nib 19 can be located on the lower end of actuating shaft 11 or on the upper end of counter balance shaft 15. Thus, mechanism 10 at a minimum could comprise a single shaft, counter balance shaft 15, with activating plunger 12 located on the lower end, and nib 19 located on the upper end. The other shafts 11 and 18, as well as spur gear 14, would not be needed.

A mirror arrangement of the device on FIG. 1 could be constructed so that two mechanisms can be placed side by side and thus independently activate two different buttons. As shown in FIG. 2, nib 19 is close to an edge of housing 23, and therefore, a second mirrored mechanism can be placed such that the nib of each mechanism is located close to the other nib. FIG. 2 depicts a portion 21 of housing 23 removed to permit viewing of the internal features, this need not be present on the actual device. Note that button pushing shaft can be connected to more than one nib, and thus can push more than one button simultaneously.

Although the present invention and its advantages have been described in detail, it should be understood that various changes, substitutions and alterations can be made herein without departing from the spirit and scope of the invention as defined by the appended claims.

What is claimed is:

1. An actuating mechanism for actuating an interface on a device undergoing testing, wherein the mechanism is mounted on an automatic testing machine, the actuating mechanism comprising:

an actuating shaft that receives a pneumatic force;

a counter balance shaft which includes a predetermined mass to form a gravitational force which is opposed to the pneumatic force; and an interface shaft which contacts the interface on the device;

wherein the interface shaft moves to contact the device upon application of the pneumatic force and retracts from contact upon application of the gravitational force.

2. The mechanism of claim 1, wherein:

the counterbalance shaft is mounted in a vertical direction.

3. The mechanism of claim 1, wherein:

the interface is a button.

4. The mechanism of claim 1, further comprising:

a spur gear that is connected to the actuating shaft and to the counter balance shaft, and rotates in a first rotation direction if the pneumatic force exceeds the gravitation force and rotates in a second rotation direction if the gravitational force exceeds the pneumatic force.

5. The mechanism of claim 4, wherein:

rotation of the gear in the first rotation direction causes the interface shaft to move to contact the interface on the device.

6. The mechanism of claim 4, wherein:

rotation of the gear in the second rotation direction causes the interface shaft to retract from contact with the interface on the device.

7. The mechanism of claim 4, wherein:

the actuating shaft has a toothed face for connection to the spur gear.

8. The mechanism of claim 7, wherein:

the connection of the actuating shaft and the spur gear is in a rack and pinon manner.

9. The mechanism of claim 4, wherein:

the counterbalance shaft has a toothed face for connection to the spur gear.

10. The mechanism of claim 9, wherein:

the connection of the counterbalance shaft and the spur gear is in a rack and pinon manner.

11. The mechanism of claim 4, wherein:

the interface shaft has a toothed face for connection to the spur gear.

12. The mechanism of claim 11, wherein:

the connection of the interface shaft and the spur gear is in a rack and pinon manner.

13. The mechanism of claim 4, wherein:

the spur gear translates motion of the actuating shaft from application of the pneumatic force into the first rotation direction, and re-translates motion in the first rotation direction into motion of the interface shaft to contact the interface.

14. The mechanism of claim 4, wherein:

the spur gear translates motion of the actuating shaft from application of the pneumatic force into the first rotation direction, and re-translates motion in the first rotation direction into motion of the counter balance shaft opposite to a motion caused by the gravitational force.

15. The mechanism of claim 4, wherein:

the spur gear translates motion of the counter balance shaft from application of the gravitational force into the second rotation direction, and re-translates motion in the second rotation direction into motion of the interface shaft to retract from contact with the interface.

16. The mechanism of claim 4, wherein:

the spur gear translates motion of the counter balance shaft from application of the gravitational force into the second rotation direction, and re-translates motion in the second rotation direction into motion of the actuating shaft opposite to a motion caused by the pneumatic force.

17. The mechanism of claim 1, wherein:

the actuating shaft is the interface shaft.

18. The mechanism of claim 1, wherein:

the interface shaft is mounted at an angle to the counter balance shaft.

19. The mechanism of claim 18, wherein:

the angle is approximately 90 degrees.

20. The mechanism of claim 18, wherein:

the angle is approximately 0 degrees.

21. The mechanism of claim 18, wherein:

the angle is approximately 180 degrees.

22. The mechanism of claim 1, further comprising:

a snap ring mounted on the interface shaft which restricts a distance of retraction of the interface shaft.

23. An actuating mechanism for actuating an interface on a device undergoing testing, wherein the mechanism is mounted on an automatic testing machine, the actuating mechanism comprising:

first means for receiving a pneumatic force;

second means for providing a gravitational force which is opposed to the pneumatic force; and third means for contacting the interface on the device upon application of the pneumatic force via the first means and for retracting from contact upon application of the gravitational force via the second means.

24. The mechanism of claim 23, further comprising:

connection means for interconnecting the first means, second means, and third means, and for associating the pneumatic force with the gravitational force.

25. The mechanism of claim 23, wherein:

the second means has a predetermined mass to form the gravitational force.

26. The mechanism of claim 23, wherein:

the interface is a button.

27. An actuating mechanism for actuating an interface on a device undergoing testing, wherein the mechanism is mounted on an automatic testing machine, the actuating mechanism comprising:

an actuating shaft that receives a pneumatic force;

a counter balance shaft which includes a predetermined mass to form a gravitational force which is opposed to the pneumatic force; and an interface shaft which contacts the interface on the device;

a spur gear that is connected to the actuating shaft, the interface shaft, and the counter balance shaft, and rotates in a first rotation direction if the pneumatic force exceeds the gravitation force and rotates in a second rotation direction if the gravitational force exceeds the pneumatic force;

wherein the interface shaft moves to contact the device upon rotation of the spur gear in the first rotation direction and retracts from contact upon rotation of the spur gear in the second rotation direction.

28. The mechanism of claim 27, wherein:

the counterbalance shaft is mounted in a vertical direction.

29. The mechanism of claim 27, wherein:

the interface is a button.

30. The mechanism of claim 27, wherein:

the actuating shaft has a toothed face for connection to the spur gear;

the counterbalance shaft has a toothed face for connection to the spur gear; and the interface shaft has a toothed face for connection to the spur gear.

31. The mechanism of claim 30, wherein:

the connection of the actuating shaft and the spur gear is in a rack and pinon manner;

the connection of the counterbalance shaft and the spur gear is in a rack and pinon manner; and the connection of the interface shaft and the spur gear is in a rack and pinon manner.

32. The mechanism of claim 27, wherein:

the spur gear translates motion of the actuating shaft from application of the pneumatic force into the first rotation direction, and re-translates motion in the first rotation direction into motion of the interface shaft to contact the interface;

the spur gear translates motion of the actuating shaft from application of the pneumatic force into the first rotation direction, and re-translates motion in the first rotation direction into motion of the counter balance shaft opposite to a motion caused by the gravitational force;

the spur gear translates motion of the counter balance shaft from application of the gravitational force into the second rotation direction, and re-translates motion in the second rotation direction into motion of the interface shaft to retract from contact with the interface; and the spur gear translates motion of the counter balance shaft from application of the gravitational force into the second rotation direction, and re-translates motion in the second rotation direction into motion of the actuating shaft opposite to a motion caused by the pneumatic force.

33. The mechanism of claim 27, wherein:

the interface shaft is mounted at an angle to the counter balance shaft.

34. A method for actuating an interface on a device undergoing testing on an automatic testing machine, the method comprising the steps of:

applying a pneumatic force;

applying a gravitational force which is opposed to the pneumatic force;

contacting the interface on the device upon applying the pneumatic force; and retracting from the interface upon applying the gravitational force.

35. The method of claim 34, further comprising the steps of:

combining the pneumatic force and the gravitational force;

performing the step of contacting when the pneumatic force exceeds the gravitational force; and performing the step of retracting when the gravitational force exceeds the pneumatic force.

36. The method of claim 35, wherein:

the interface is a button.

* * * * *